United States Patent [19]

Gothard

[11] Patent Number: 4,709,657
[45] Date of Patent: Dec. 1, 1987

[54] AQUATIC VIEWING SYSTEM
[75] Inventor: Patrick G. Gothard, Casper, Wyo.
[73] Assignee: Aquarium Pharmaceuticals, Inc., Chalfont, Pa.
[21] Appl. No.: 849,878
[22] Filed: Apr. 9, 1986
[51] Int. Cl.$^4$ ............................................. A01K 63/00
[52] U.S. Cl. ....................................... 119/5; D16/136
[58] Field of Search ................. 119/5; D16/135, 136, D16/137; 350/243, 244, 250, 251, 257

[56] References Cited

U.S. PATENT DOCUMENTS

| D. 151,784 | 11/1948 | Riemann | D16/137 |
| D. 215,245 | 9/1969 | Schwab | 350/251 X |
| 1,971,519 | 8/1934 | Bradford | 350/244 X |
| 3,282,251 | 11/1966 | Dahmus | 119/23 |
| 3,527,524 | 9/1970 | Pace et al. | 350/251 X |
| 4,538,547 | 9/1985 | Del Rosario | 119/5 |

FOREIGN PATENT DOCUMENTS 3017230 11/1981 Fed. Rep. of Germany .......... 119/5

Primary Examiner—Robert P. Swiatek
Attorney, Agent, or Firm—Dean P. Edmundson

[57] ABSTRACT

An aquatic viewing system is described for enabling a person to see magnified images of marine life contained in an aquarium. The system includes a magnifying lens and mounting attachment attached to the periphery of the lens. The mounting attachment is adapted to be detachably mounted to a transparent face of the aquarium. The lens may be moved to any desired viewing location on the aquarium by detaching the mounting attachment from the face of the aquarium and re-positioning the mounting attachment and lens at the desired viewing location.

13 Claims, 8 Drawing Figures

AQUATIC VIEWING SYSTEM

FIELD OF THE INVENTION

This invention relates to viewing of aquatic life. More particularly, this invention relates to systems for viewing marine animals and fish which are contained in an aquarium.

BACKGROUND OF THE INVENTION

Aquariums are commonplace in homes and offices throughout the country. Various types of fish and other marine life are contained in the aquariums.

It is often desirable to be able to see the fish or other marine life more closely than is possible when simply viewing them through one face of the aquarium. Although it is possible to remove the fish or other creatures from the aquarium to examine them, this is not always practical or desirable. Furthermore, by taking the fish out of the water it is not possible to observe them in their normal aquatic environment.

U.S. Pat. No. 4,538,547 describes a fish tank having opaque walls with a window which may be a magnifying type. However, such a window is fixed in place and may not be moved about to a desired location. Furthermore, an aquarium of this type would be expensive to construct because of the special type of window required.

There has not heretofore been provided any means for closely observing fish or other marine life in their aquatic environment.

SUMMARY OF THE INVENTION

In accordance with the invention there is provided an aquatic viewing system for enabling a person to see magnified images of marine life contained in an aquarium. The viewing system of the invention comprises:
 (a) a magnifying lens;
 (b) mounting means attached to the periphery of the lens.

The mounting means is adapted to be detachably mounted to a transparent face of the aquarium.

The magnifying lens may be moved to any desired viewing location on the face of the aquarium by detaching the mounting means from the face and re-positioning the mounting means and the magnifying lens at the desired viewing location.

A preferred form of mounting means is a suction cup which may be secured to the edge of the magnifying lens (e.g., by means of an adhesive). Preferably there are a plurality of suction cups or other types of mounting means attached to the lens or to a frame surrounding the lens.

The suction cups or other types of mounting means used may be of bright colors so as to attract fish to the location where the magnifying lens is attached to the face of the aquarium. Some types of fish are attracted to one color while other types of fish are attracted more to other colors. Thus, by using suction cups of different colors it is possible to attract different types of fish to the location next to the face of the aquarium where the magnifying lens is attached.

The viewing system of this invention is easily moved to any desired location on the face of an aquarium, thus enabling a person to view a magnified image of any portion of the aquarium. The system of the invention thus can be used for educational, recreational and scientific purposes.

The aquatic viewing system is inexpensive, easy to use, and may be used in connection with any conventional aquarium, of any size or shape. The size of lens used, and the degree of magnification of the lens used, may vary as desired. The shape may also vary.

BRIEF DESCRIPTION OF THE DRAWINGS

The invention is described in more detail hereinafter with reference to the accompanying drawings wherein like reference characters refer to the same parts throughout the several views and in which.

DETAILED DESCRIPTION OF THE INVENTION

Figure 1:
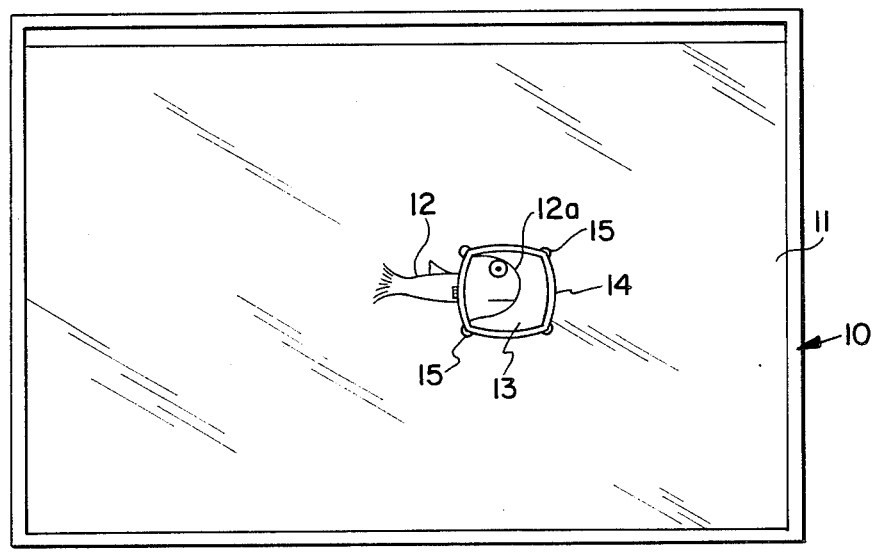
FIG. 1 is an elevational view of an aquarium illustrating the use of the aquatic viewing system of this invention.

In FIG. 1 there is illustrated one embodiment of aquatic viewing system of the invention. There is shown aquarium 10 containing fish 12 and an aqueous medium. The aquarium includes at least one transparent side or face 11 through which the fish or other marine life can be seen in the water.

Temporarily attached to the face 11 of the aquarium is a magnifying lens 13 surrounded by frame member 14. A plurality of suction cups 15 connected to frame 14 hold the lens 13 and frame 14 to face 11, as shown. The fish 12 in aquarium 10 is magnified as it swims past the lens 13, as illustrated. The enlarged image of the fish is denoted 12a.

Figure 2:
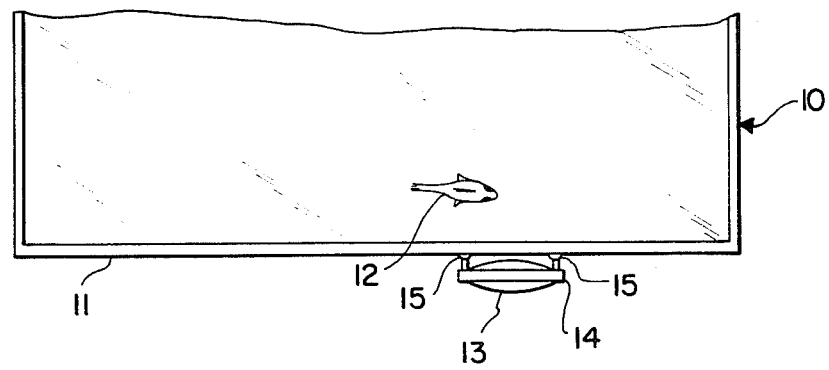
FIG. 2 is a top view of the aquarium and viewing system of FIG. 1.

A top view of the aquarium and viewing system is shown in FIG. 2. The suction cups adhere to the face 11 of aquarium 10 and hold the lens 13 and frame 14 firmly with respect to face 11. The opposite end of each suction cup is secured to the frame member. If desired, however, the suction cups could be secured directly to the lens itself (e.g., at its periphery). The suction cups may be adhered to the lens or the frame in many different ways (e.g., by means of an adhesive, or by mechanical fasteners, e.g., screws).

The magnifying lens and the means for mounting it on the face of the aquarium are re-positionable. In other words, the lens is not permanently mounted on face 11. Rather, it is intended that the lens be readily and easily movable to any desired viewing location on face 11 or any other transparent face of the aquarium. This is easily effected by detaching the mounting means from the face 11, moving the lens to any desired viewing location, and then re-attaching the mounting means to the aquarium. This re-positioning may be done as often as desired.

The magnifying lens may be made of glass or plastic, although plastic is presently preferred because it is inexpensive and light in weight. The size of the lens may also vary, as desired. The degree of magnification provided by the lens may also vary, as desired. In other words, a lens may be selected of any desired degree of magnification.

The shape of the lens may also vary. For example, it may be circular, oval, square, rectangular, or any other desired shape. The lens preferably is surrounded by a frame member as illustrated in the drawings. The type of frame member selected may also vary considerably. For example, it may be plastic, wood, metal, rubber, etc. When the lens is composed of plastic, the frame may also be composed of plastic and heat bonded to the lens, for example. If desired, the plastic lens and plastic frame may be molded at the same time so as to be an integral unit.

Figure 3:
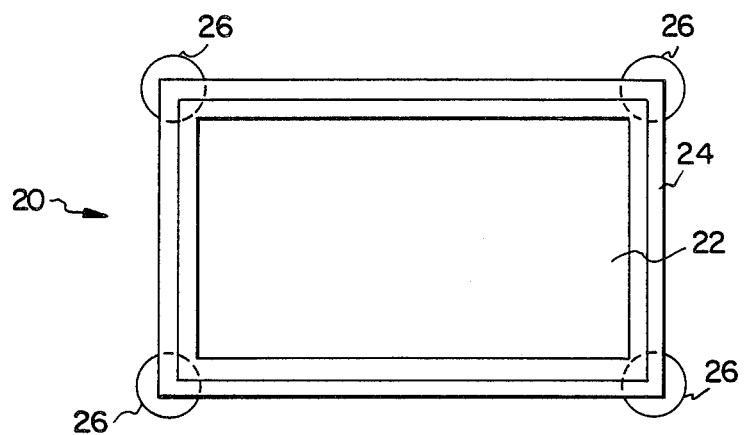
FIG. 3 is a front view of another type of lens system which is useful in the present invention.

FIG. 3 illustrates a rectangular embodiment of viewing system 20 of the invention in which magnifying lens 22 is contained and supported within frame member 24. A plurality of suction cups 26 are secured to the frame member.

Figure 4:
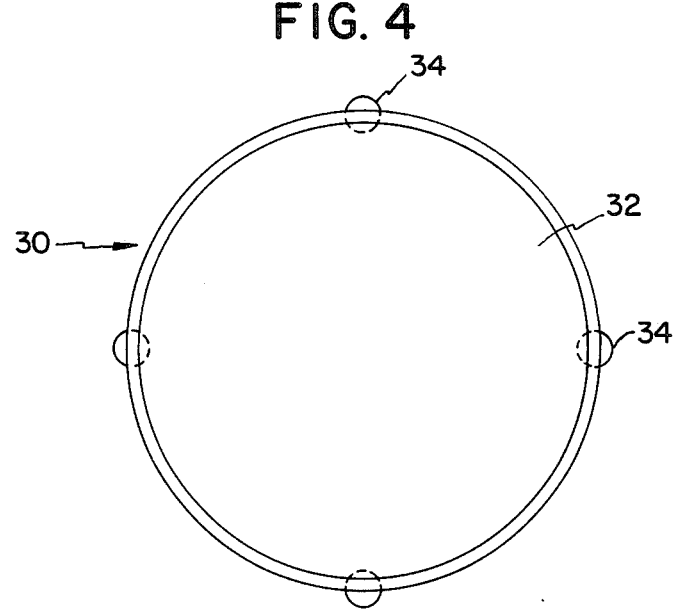
FIG. 4 is a front view of another type of lens system which is useful in the present invention.

FIG. 4 illustrates another embodiment of viewing system 30 of the invention in which the lens 32 is circular. A plurality of suction cups 34 are secured to the frame or periphery of the lens, as illustrated. Instead of using a plurality of suction cups spaced around the periphery of the lens it is possible to use one ring-shaped suction cup which extends along the entire periphery of the lens.

Figure 5:
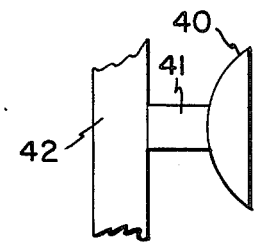
FIG. 5 is an edge or side view of a portion of a viewing system of this invention.

FIG. 5 is an edge or side view illustrating one manner of attaching the suction cup 40 to the edge of lens 42. A stem 41 is attached at one end to the suction cup 40 and is secured at its opposite end to the edge of lens 42. The stem may be plastic, rubber or any other desired material.

Figure 6:
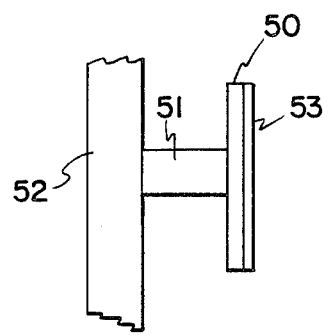
FIG. 6 is an edge or side view of another embodiment of mounting means which is useful in the present invention.

FIG. 6 is an edge or side view illustrating another type of mounting means which may be used to mount the lens 52 onto the face of an aquarium. Adhesive layer 53 is carried by pad 50. Stem 51 connects the pad 50 to the edge of lens 52, as illustrated. The adhesive may be, for example, a permanently pressure-sensitive adhesive.

Figure 7:
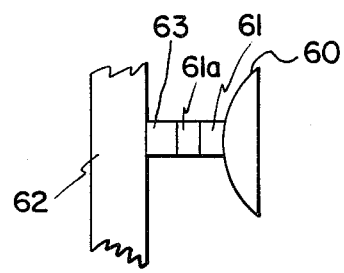
FIG. 7 is an edge or side view of another embodiment of mounting means which is useful in the present invention.

FIG. 7 is an edge or side view illustrating another variation of mounting system which may be used in this invention. In this embodiment there is a two-part stem in which a magnet is included. For example, stem 61 includes magnet 61a. Stem 63 is metallic and therefore will be attracted to magnet 61a when in close proximity. Stem portion 63 is secured to the edge of lens 62. When this embodiment is used, a plurality of suction cups may be attached to the face of an aquarium at various locations. The lens may then be easily moved from one location to another without detaching any of the suctions cups.

In another variation of this embodiment, the magnet may be replaced with a conventional hook and loop fastener material such as Velcro, i.e., one portion is mounted on stem 61 and a mating portion is mounted on stem 63.

Figure 8:
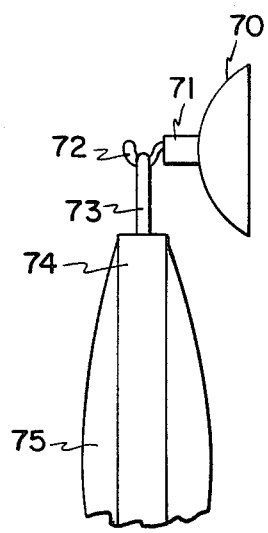
FIG. 8 is an edge or side view of another embodiment of mounting means which is useful in the present invention.

In FIG. 8 there is illustrated yet another version of the invention in which the stem 71 of suction cup 70 includes a hook member 72. A hanger 73 attached to frame member 74 carrying lens 75 is adapted to be suspended from hook 72, as illustrated. With this embodiment the lens may be removed very easily, e.g., for cleaning or for replacement with a different lens. Also, if a plurality of such suction cups are attached to the face of an aquarium at various locations, then the lens may be suspended from any one of such suction cups and easily moved from one to another, as desired.

Other variants are possible without departing from the scope of this invention.

What is claimed is:

1. A method for viewing magnified images of marine life contained in an aquarium, said method comprising the steps of:
   (a) providing a magnifying lens and mounting means attached to the periphery of said lens;
   (b) detachably attaching said mounting means to a transparent face of said aquarium at a desired viewing location; and
   (c) viewing said marine life through said magnifying lens.

2. A method in accordance with claim 1, wherein said mounting means comprises at least one suction cup.

3. A method in accordance with claim 1, wherein said magnifying lens includes a frame member surrounding and supporting said lens.

4. A method in accordance with claim 3, wherein said mounting means is attached to said frame member.

5. A method in accordance with claim 3, wherein said mounting means comprises a suction cup which is detachably connected to said frame member by means of a magnet.

6. A method in accordance with claim 3, wherein said mounting means includes a hook member, and wherein said frame member is adapted to be suspended from said hook member.

7. A method in accordance with claim 1, wherein said mounting means comprises an adhesive.

8. A method in accordance with claim 1, further comprising the steps of:
   (d) detaching said mounting means from said face of said aquarium;
   (e) moving said lens and mounting means to a second desired viewing location;
   (f) attaching said mounting means to said face of said aquarium at said second viewing location; and
   (g) viewing said marine life at said second location through said magnifying lens.

9. An aquatic viewing system for enabling a person to view magnified images of marine life contained in an aquarium, said aquatic viewing system comprising in combination:
   (a) an aquarium having at least one transparent face, said aquarium containing an aqueous medium and marine life in said medium;
   (b) a magnifying lens; and
   (c) mounting means attached to the periphery of said lens; wherein said mounting means is adapted to be detachably mounted to said face of said aquarium; wherein said magnifying lens is adapted to be moved to any desired viewing location on said face by detaching said mounting means from said face and re-positioning said mounting means and lens at said desired viewing location.

10. An aquatic viewing system in accordance with claim 9, wherein said mounting means comprises at least one suction cup.

11. An aquatic viewing system in accordance with claim 9, wherein said magnifying lens includes a frame member surrounding and supporting said lens, and wherein said mounting means is attached to said frame.

12. An aquatic viewing system in accordance with claim 9, wherein said mounting means comprises a suction cup which is detachably connected to said lens by means of a magnet.

13. An aquatic viewing system in accordance with claim 9, wherein said mounting means includes a hook member, and wherein said lens is adapted to be suspended from said hook member.

* * * * *